US008869909B2

(12) United States Patent
Blunier et al.

(10) Patent No.: US 8,869,909 B2
(45) Date of Patent: Oct. 28, 2014

(54) WING FOLDING ARRANGEMENT FOR AN AGRICULTURAL IMPLEMENT

(75) Inventors: Timothy R. Blunier, Danvers, IL (US);
Matthew R. Sudbrink, Metamora, IL (US); Jessica Haynes, West Bend, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/604,689

(22) Filed: Sep. 6, 2012

(65) Prior Publication Data

US 2014/0060866 A1     Mar. 6, 2014

(51) Int. Cl.
*A01B 49/00* (2006.01)

(52) U.S. Cl.
USPC .......................................... 172/311

(58) Field of Classification Search
USPC .......... 172/311, 456, 292, 776; 111/119, 121, 111/140, 129, 122, 123, 187
See application file for complete search history.

(56) References Cited

U.S. PATENT DOCUMENTS

| 3,401,752 | A | | 9/1968 | Nja |
| 3,669,195 | A | * | 6/1972 | Green et al. ................. 172/311 |
| 3,967,684 | A | * | 7/1976 | Haverdink ................... 172/311 |
| 4,133,391 | A | * | 1/1979 | Richardson et al. .......... 172/311 |
| 4,204,575 | A | * | 5/1980 | Richardson et al. ............ 172/1 |
| 4,206,816 | A | * | 6/1980 | Richardson et al. .......... 172/311 |
| 4,320,805 | A | | 3/1982 | Winter |
| 4,534,416 | A | | 8/1985 | Johnson |
| 4,867,245 | A | * | 9/1989 | Stevens ....................... 172/311 |
| 4,974,684 | A | * | 12/1990 | Stevens ....................... 172/311 |
| 5,178,328 | A | * | 1/1993 | Broyhill ....................... 239/168 |
| 6,089,329 | A | * | 7/2000 | Smith ......................... 172/452 |
| 6,109,012 | A | * | 8/2000 | Staal et al. ..................... 56/367 |
| 6,148,746 | A | * | 11/2000 | Kopycinski .................. 111/119 |
| 6,220,366 | B1 | * | 4/2001 | Noonan et al. ............... 172/311 |
| 6,367,562 | B1 | * | 4/2002 | Mosdal ....................... 172/311 |
| 6,382,326 | B1 | * | 5/2002 | Goins et al. .................. 172/239 |

(Continued)

FOREIGN PATENT DOCUMENTS

| EP | 0581103 A1 | 2/1994 |
| NL | 1020786 C2 | 12/2003 |
| WO | 9007867 A1 | 7/1990 |

OTHER PUBLICATIONS (2011) Krause 4400 "Flex Wing Packers" http://www.krauseco.com/pdf/4400.pdf (2011).

(Continued)

*Primary Examiner* — Árpád Fábián-Kovács
(74) *Attorney, Agent, or Firm* — Rebecca L. Henkel

(57) ABSTRACT

A wing folding arrangement for an agricultural implement includes a tool bar assembly having a central tool bar, a first wing tool bar rotatably coupled to a first end of the central tool bar, a second wing tool bar rotatably coupled to the first wing tool bar, a third wing tool bar rotatably coupled to a second end of the central tool bar, and a fourth wing tool bar rotatably coupled to the third wing tool bar. The agricultural implement also includes row units coupled to the tool bar assembly and configured to deliver flowable agricultural product to a field. The second wing tool bar is configured to fold over the first wing tool bar, the fourth wing tool bar is configured to fold over the third wing tool bar, and the first and third wing tool bars are configured to fold crosswise over the central tool bar.

12 Claims, 4 Drawing Sheets

(56) References Cited

U.S. PATENT DOCUMENTS

| | | |
|---|---|---|
| 6,415,873 B1 * | 7/2002 | Hudgins .................. 172/311 |
| 6,422,483 B1 * | 7/2002 | Yocom et al. ............ 239/159 |
| 6,561,283 B2 * | 5/2003 | Hundeby ................. 172/459 |
| 6,675,907 B2 * | 1/2004 | Moser et al. ............ 172/311 |
| 6,684,962 B1 * | 2/2004 | Lewallen ................. 172/311 |
| 7,004,090 B2 * | 2/2006 | Swanson ................. 111/119 |
| 7,043,889 B2 * | 5/2006 | Rauch ...................... 56/15.9 |
| 7,073,604 B1 * | 7/2006 | Dobson et al. .......... 172/311 |
| 7,152,539 B2 * | 12/2006 | Swanson ................ 111/119 |
| 7,438,137 B2 * | 10/2008 | Pederson et al. ....... 172/311 |
| 7,497,269 B2 * | 3/2009 | Jagow ..................... 172/311 |
| 7,870,827 B2 * | 1/2011 | Bassett ................... 111/119 |
| 8,118,110 B2 | 2/2012 | Tamm et al. |
| 8,146,519 B2 * | 4/2012 | Bassett ................... 111/119 |
| 8,327,780 B2 * | 12/2012 | Bassett ................... 111/119 |
| 8,505,645 B1 * | 8/2013 | Kelly et al. ............. 172/311 |
| 2004/0188109 A1 | 9/2004 | Domries |

OTHER PUBLICATIONS (2008) "Rolling Harrow Soil Conditioner"http://umequip.com/literature/seedbedtillage/umrollingharrow.pdf.

\* cited by examiner

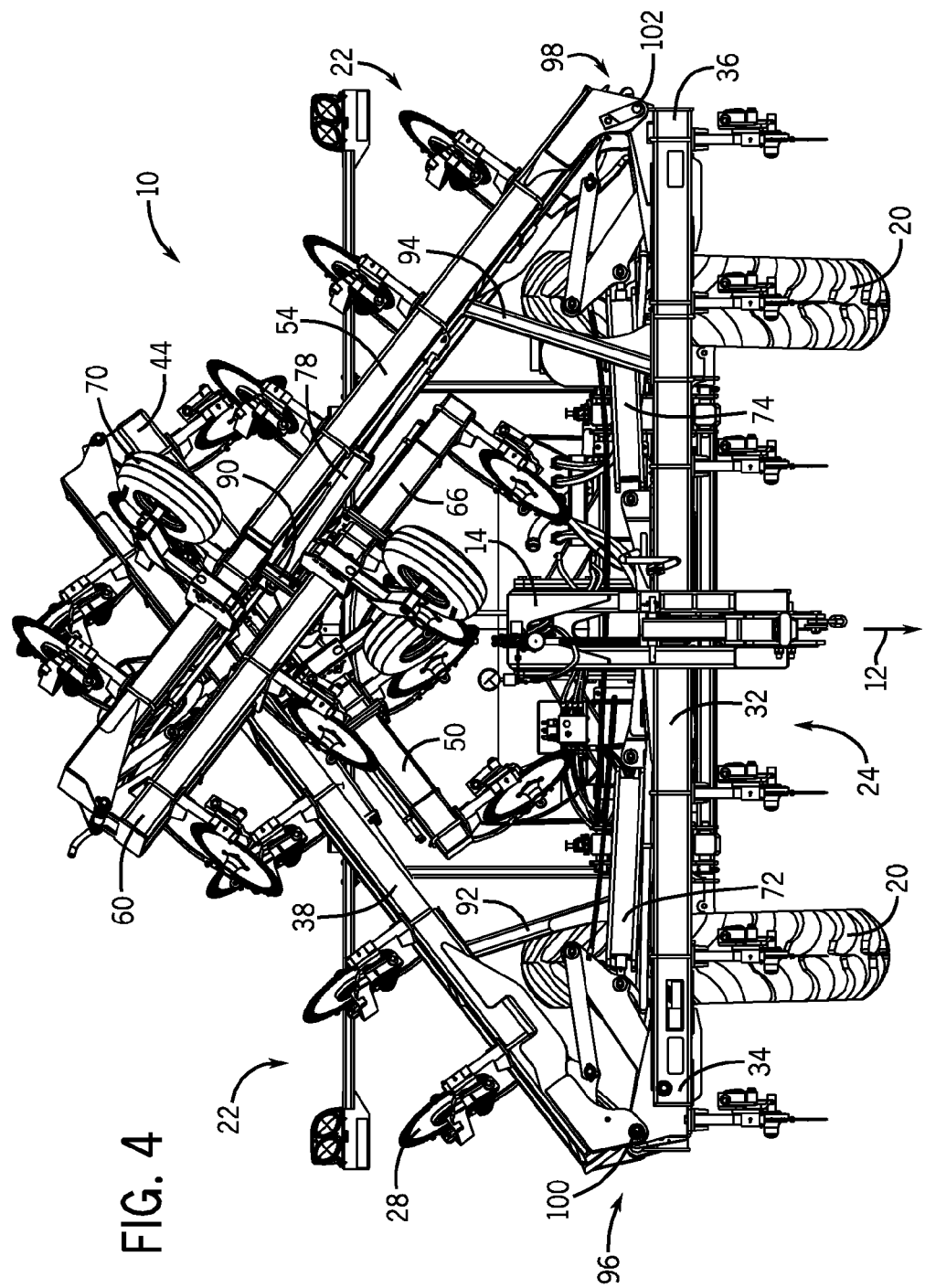

US 8,869,909 B2

WING FOLDING ARRANGEMENT FOR AN AGRICULTURAL IMPLEMENT

BACKGROUND

The invention relates generally to ground working equipment, such as agricultural equipment, and more specifically, to a wing folding arrangement for an agricultural implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of the injection nozzles, to flow the liquid fertilizer into respective trenches formed by the openers and the knives. Using such implements, fertilizer may be distributed throughout a field, either before or after planting, to facilitate enhanced crop development.

A fertilizer application implement may have various folded or unfolded positions for use during operation, transportation, and/or storage. For example, the fertilizer application implement may include a working position where a tool bar of the implement is unfolded for applying fertilizer throughout the filed. As another example, the fertilizer application implement may include a transport position where the tool bar of the implement is folded for transportation and/or storage of the implement. A current trend for fertilizer application implements, and other implements, is to increase their working position span. Increasing the span of a fertilizer application implement may facilitate distribution of fertilizer over a wider swath of soil, thereby distributing the fertilizer throughout a field at a faster rate. However, as the span of the working position of the fertilizer application implement increases, a size (e.g., height, width, etc.) of the fertilizer application implement in the transport position may increase. Unfortunately, an increase in the size of the implement in the transport position may reduce the stability of the fertilizer application implement during transportation, and/or inhibit storage of the implement.

BRIEF DESCRIPTION

In one embodiment, an agricultural implement includes a tool bar assembly having a central tool bar, a first wing tool bar rotatably coupled to a first end of the central tool bar, and a second wing tool bar rotatably coupled to the first wing tool bar. The tool bar assembly also includes a third wing tool bar rotatably coupled to a second end of the central tool bar, and a fourth wing tool bar rotatably coupled to the third wing tool bar. The agricultural implement also includes row units coupled to the tool bar assembly and configured to deliver flowable agricultural product to a field. The second wing tool bar is configured to fold over the first wing tool bar, the fourth wing tool bar is configured to fold over the third wing tool bar, and the first and third wing tool bars are configured to fold crosswise over the central tool bar.

In another embodiment, an agricultural implement includes a tool bar assembly having a central tool bar and a pair of inner wing tool bars rotatably coupled to the central tool bar. The agricultural implement also includes a pair of outer wing tool bars. Each outer wing tool bar being coupled to a respective inner wing tool bar of the pair of inner wing tool bars. The outer wing tool bars are configured to fold parallel to the inner wing tool bars and the inner wing tool bars are configured to fold crosswise over the central tool bar.

In a further embodiment, an agricultural implement including a tool bar assembly having a central tool bar, a first wing tool bar rotatably coupled to a first end of the central tool bar and a second wing tool bar rotatably coupled to the first wing tool bar. The tool bar assembly also includes a third wing tool bar rotatably coupled to a second end of the central tool bar, and a fourth wing tool bar rotatably coupled to the third wing tool bar. The central tool bar, the first wing tool bar, the second wing tool bar, the third wing tool bar, and the fourth wing tool bar are substantially aligned with one another while the agricultural implement is in a working position. The second wing tool bar is configured to fold over the first wing tool bar, the fourth wing tool bar is configured to fold over the third wing tool bar, and the first and third wing tool bars are configured to fold crosswise over the central tool bar to transition the agricultural implement from the working position to a transport position.

DRAWINGS

These and other features, aspects, and advantages of the present invention will become better understood when the following detailed description is read with reference to the accompanying drawings in which like characters represent like parts throughout the drawings, wherein:

FIG. 4 is a front view of the agricultural implement of FIG. 1 with the tool bar assembly in a transport position.

DETAILED DESCRIPTION

Figure 1:
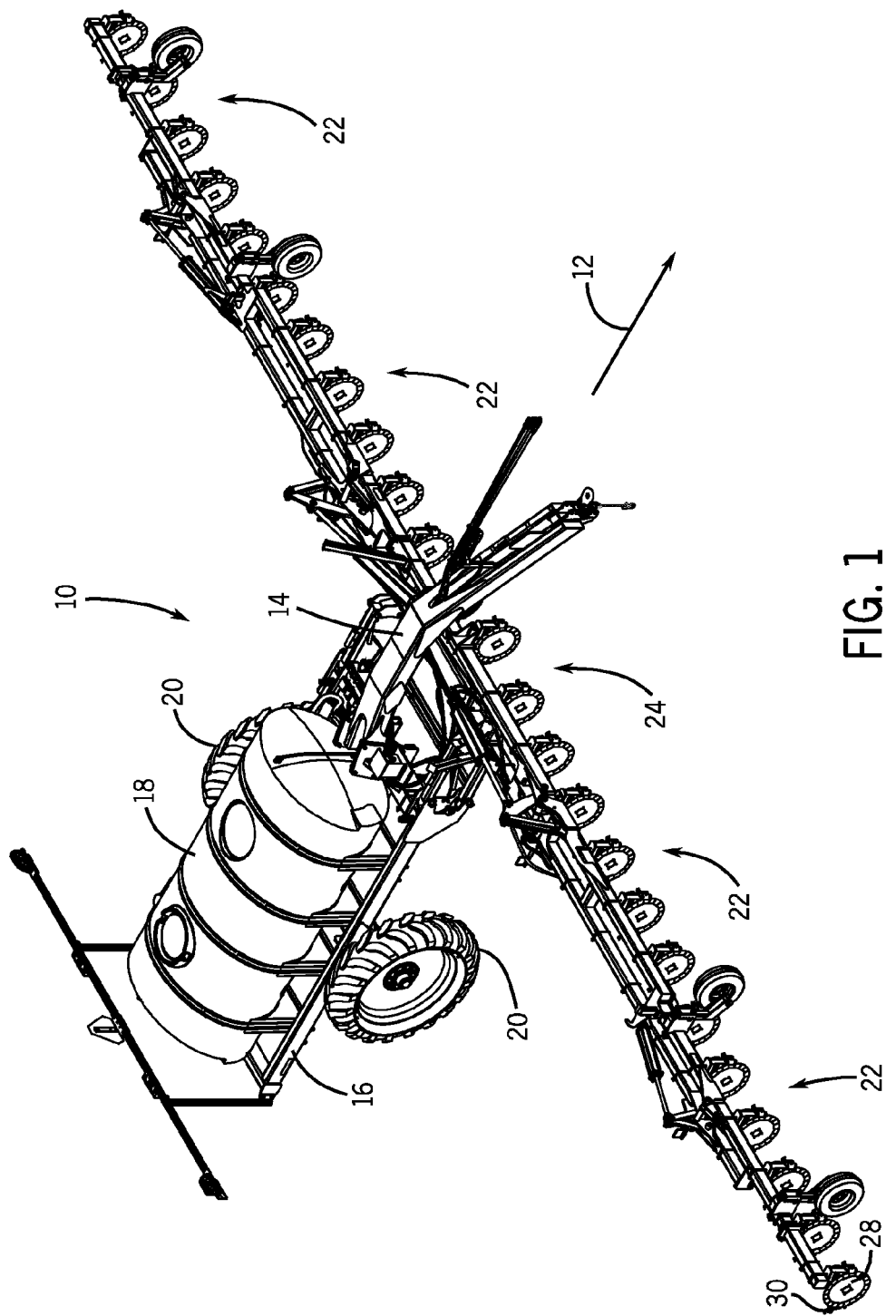
FIG. 1 is a perspective view of an embodiment of an agricultural implement including a tool bar assembly having multiple wings in a working position.

FIG. 1 is a perspective view of an embodiment of an agricultural implement 10 including a tool bar assembly having multiple wings in a working position. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as liquid fertilizer. A pair of wheels 20 coupled to the main frame 16 is configured to support the weight of the frame 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24 having a central tool bar, a first wing tool bar, a second wing tool bar, a third wing tool bar, and a fourth wing tool bar. Each row unit 22 includes a ground engaging tool 28 configured to break the soil, thereby excavating a trench into the soil. An injection nozzle or knife 30 (e.g., positioned behind the ground engaging tool) is configured to deposit flowable agricultural product from the storage tank 18 into the trench formed by the ground engaging tool 28. In certain embodiments, the penetration depth of the ground engaging tools 28 is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., the approximate midpoint between rows), thereby facilitating enhanced crop development. In addition, the implement 10 may be utilized to apply fertilizer to previously planted seeds (e.g., via injecting fertilizer between rows of the previously planted seeds).

As discussed above, the tool bar assembly 24 includes multiple tool bar sections, such as the central tool bar, inner wing tool bars (e.g., the first wing tool bar, the third wing tool bar), and outer wing tool bars (e.g., the second wing tool bar, the fourth wing tool bar). In the illustrated embodiment, the agricultural implement 10 is in a working position to facilitate distribution of fertilizer throughout a field. As illustrated, the tool bar sections of the tool bar assembly 24 are substantially aligned with one another. The agricultural implement 10 may be configured to transition from the working position to a transport position. First, the outer wing tool bars fold over the inner wing tool bars. Next, the inner wing tool bars fold crosswise over the central tool bar. Accordingly, the agricultural implement 10 may fold into a compact transport position for transportation and/or storage. Because the inner tool bars fold crosswise over the central tool bar, the agricultural implement 10 may have a lower center of gravity to facilitate greater stability during transportation as compared to an agricultural implement that does not fold crosswise over the central tool bar. Further, by being compact when folded, the agricultural implement 10 may be transported and/or stored in more locations and with greater ease than implements not having a compact folding arrangement.

Figure 2:
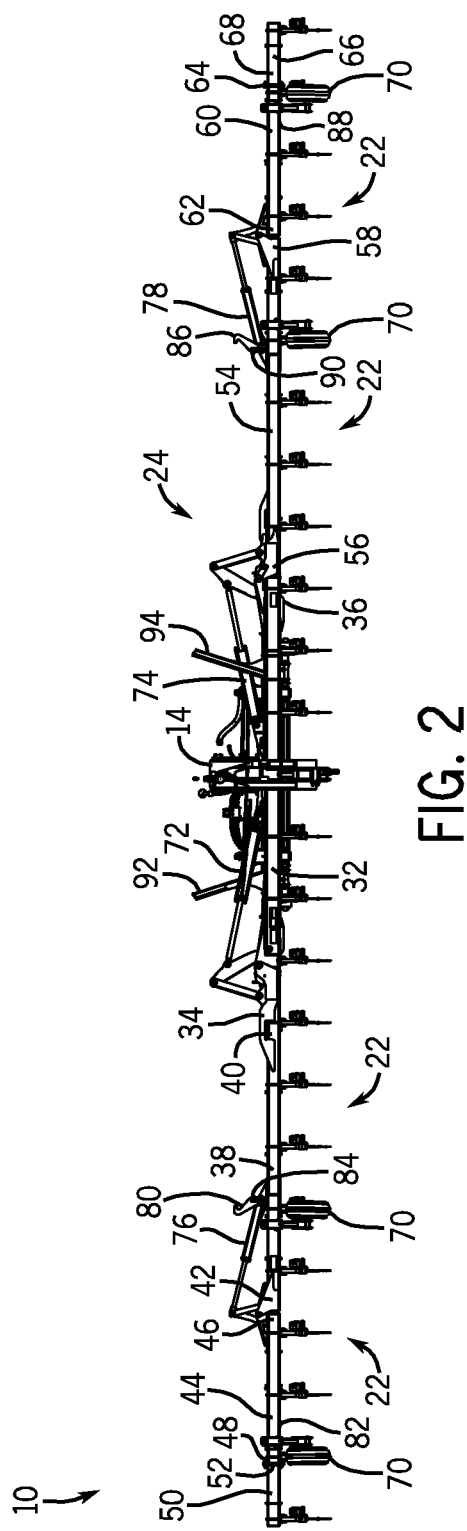
FIG. 2 is a front view of the agricultural implement of FIG. 1.

FIG. 2 is a front view of the agricultural implement 10 of FIG. 1. As illustrated, the tool bar assembly 24 includes a central section and four wing sections. Specifically, the tool bar assembly 24 includes a central tool bar 32 having a first end 34 and a second end 36. The first end 34 of the central tool bar 32 is rotatably coupled to a first wing tool bar 38. The first wing tool bar 38 includes a first end 40 and a second end 42. As illustrated, the first end 34 of the central tool bar 32 is rotatably coupled to the first end 40 of the first wing tool bar 38. Moreover, the second end 42 of the first wing tool bar 38 is rotatably coupled to a second wing tool bar 44. The second wing tool bar 44 also includes a first end 46 and a second end 48. The second end 42 of the first wing tool bar 38 is rotatably coupled to the first end 46 of the second wing tool bar 44. The second end 48 of the second wing tool bar 44 is coupled to a first tool bar extension 50. Specifically, the second end 48 of the second wing tool bar 44 is coupled to an end 52 of the first tool bar extension 50.

The second end 36 of the central tool bar 32 is rotatably coupled to a third wing tool bar 54. The third wing tool bar 54 includes a first end 56 and a second end 58. As illustrated, the second end 36 of the central tool bar 32 is rotatably coupled to the first end 56 of the third wing tool bar 54. Moreover, the second end 58 of the third wing tool bar 54 is rotatably coupled to a fourth wing tool bar 60. The fourth wing tool bar 60 also includes a first end 62 and a second end 64. The second end 58 of the third wing tool bar 54 is rotatably coupled to the first end 62 of the fourth wing tool bar 60. The second end 64 of the fourth wing tool bar 60 is rigidly coupled to a second tool bar extension 66. Specifically, the second end 64 of the fourth wing tool bar 60 is rigidly and non-rotatably coupled to an end 68 of the second tool bar extension 66.

While the tool bar assembly 24 of the present embodiment includes five sections, in other embodiments, the tool bar assembly 24 may include any suitable number of sections (e.g., one or more). As may be appreciated, depending on the number of sections of the tool bar assembly 24, any of the ends 34, 36, 42, 48, 58, and 64 of the tool bars may be considered distal ends of the tool bar assembly 24. As illustrated, wheel assemblies 70 are coupled to the tool bar assembly 24 to facilitate movement of the agricultural implement 10 through a field. Specifically, wheel assemblies 70 are coupled to the first wing tool bar 38, to the second wing tool bar 44, to the third wing tool bar 54, and to the fourth wing tool bar 60. However, in the illustrated embodiment, wheel assemblies 70 (e.g., wheels) are not be coupled to the tool bar extensions 50 and 66.

The agricultural implement 10 includes actuators 72, 74, 76, and 78 to transition the agricultural implement 10 between the working position and a transport position. For example, the actuators 72, 74, 76, and 78 may be configured to fold the agricultural implement 10 from the working position to the transport position, and/or to unfold the agricultural implement 10 from the transport position to the working position. The actuators 72, 74, 76, and 78 may include any suitable actuating device, such as the illustrated hydraulic cylinders, electric motors, pneumatic devices, and so forth. Further, while the actuators 72, 74, 76, and 78 in the present embodiment are controlled hydraulically, in other embodiments, the actuators 72, 74, 76, and 78 may be controlled pneumatically, electronically, and so forth. As illustrated, the agricultural implement 10 is in the working position with the central tool bar 32, the first wing tool bar 38, the second wing tool bar 44, the third wing tool bar 54, and the fourth wing tool bar 60 all substantially aligned with one another. By having five different tool bar sections, the agricultural implement 10 may provide flowable agricultural product to a wider swath of soil than an agricultural implement 10 with fewer tool bar sections. Further, the tool bar assembly 24 of the agricultural implement 10 may be folded from the working position to the transport position, in which the tool bar assembly 24 is in an x-shaped configuration to reduce the height of the agricultural implement 10. The reduced transport height facilitates improved stability during transportation, greater ease of transporting (e.g., due to being more compact), and/or increased options for storage (e.g., due to being more compact).

Figure 3:
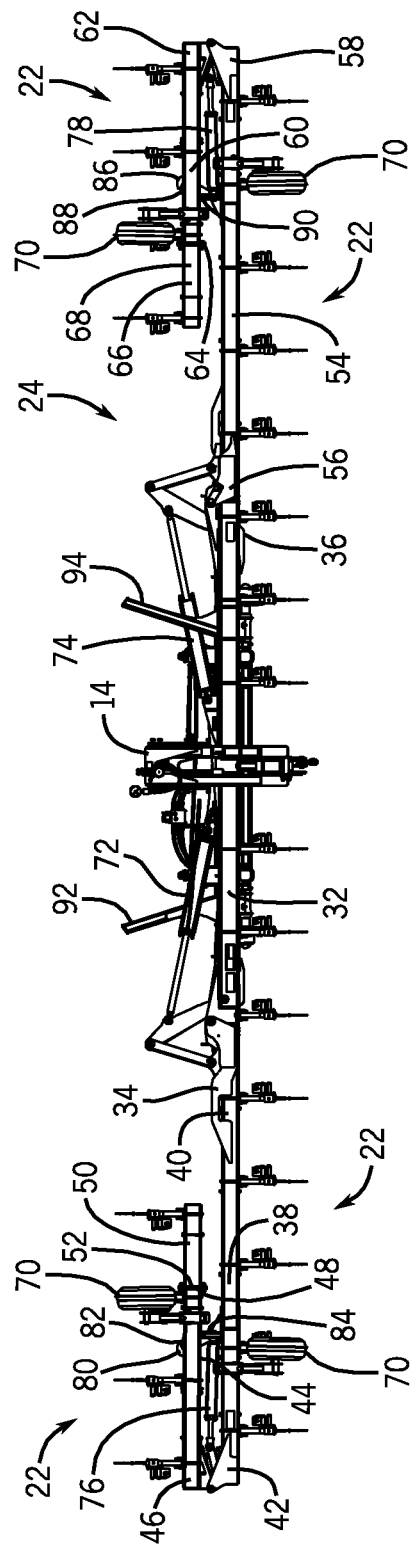
FIG. 3 is a front view of the agricultural implement of FIG. 1 with the tool bar assembly in an intermediate folded position.

FIG. 3 is a front view of the agricultural implement 10 of FIG. 1 with the tool bar assembly 24 in an intermediate folded position. To facilitate transition of the agricultural implement 10 from the working position to the intermediate folded position, the actuator 76 induces the second wing tool bar 44 to fold over the first wing tool bar 38. As illustrated, the second wing tool bar 44 is substantially parallel to the first wing tool bar 38 when folded. In other embodiments, the second wing tool bar 44 may be substantially non-parallel to the first wing tool bar 38 when folded. Further, in certain embodiments, the second wing tool bar 44 may fold under the first wing tool bar 38. The first wing tool bar 38 includes a latch 80 that hooks onto a pin 82 of the second wing tool bar 44 to hold the second wing tool bar 44 to the first wing tool bar 38. As may be appreciated, any suitable mechanism may be used to hold the first wing tool bar 38 and the second wing tool bar 44 together. As illustrated, a spacer 84 on the first wing tool bar 38 maintains a gap between the first wing tool bar 38 and the second wing tool bar 44 when folded.

Moreover, the actuator 78 induces the fourth wing tool bar 60 to fold over the third wing tool bar 54. It should be noted that the actuator 78 may be actuated at the same time as the actuator 76, or at a different time (e.g., before or after). As illustrated, the fourth wing tool bar 60 is substantially parallel to the third wing tool bar 54 when folded. In other embodiments, the fourth wing tool bar 60 may be substantially non-parallel to the third wing tool bar 54 when folded. Further, in certain embodiments, the fourth wing tool bar 60 may fold under the third wing tool bar 54. The third wing tool bar 54 includes a latch 86 that hooks onto a pin 88 of the fourth wing tool bar 60 to hold the fourth wing tool bar 60 to the third wing tool bar 54. As may be appreciated, any suitable mechanism may be used to hold the third wing tool bar 54 and the fourth wing tool bar 60 together. As illustrated, a spacer 90 on the third wing tool bar 54 maintains a gap between the third wing tool bar 54 and the fourth wing tool bar 60 when folded. It should be noted that the agricultural implement 10 may transition from the intermediate folded position to the working position in a similar manner as described (e.g., such as in a reverse order). In certain embodiments, the agricultural implement 10 may provide a flowable agricultural product to the field while in the intermediate folded position. In such embodiments, the agricultural implement 10 may provide flowable agricultural product to a smaller swath of soil than when the agricultural implement 10 is in the working position. As may be appreciated, providing flowable agricultural product to a smaller swath of soil may be useful for providing flowable agricultural products to narrow portions of a field. Moreover, providing flowable agricultural product to a smaller swath of soil may also be useful for use with different planter widths (e.g., a 24 row planter, a 16 row planter, etc.). Accordingly, as discussed above, the same agricultural implement 10 may be used to match different planter widths.

FIG. 4 is a front view of the agricultural implement 10 of FIG. 1 with the tool bar assembly 24 in the transport position. To facilitate transition of the tool bar assembly 24 from the intermediate folded position to the transport position, the actuator 72 induces the first wing tool bar 38 to fold over the central tool bar 32. As illustrated, the central tool bar 32 includes a first support bar 92 to hold the first wing tool bar 38 over the central tool bar 32 at a desired orientation. The first support bar 92 also supports the combined weight of the first and second wing tool bars 38 and 44. Moreover, the actuator 74 induces the third wing tool bar 54 to fold over the central tool bar 32. Further, the central tool bar 32 includes a second support bar 94 to hold the third wing tool bar 54 over the central tool bar 32 at a desired orientation. The second support bar 94 also supports the combined weight of the third and fourth wing tool bars 54 and 60. The first wing tool bar 38 and the third wing tool bar 54 are folded crosswise over the central tool bar 32, thereby forming an x-shaped arrangement. It should be noted that the agricultural implement 10 may transition from the transport position to the intermediate folded position in a similar manner as described (e.g., such as in a reverse order).

To facilitate the crosswise folding to the first wing tool bar 38 and the third wing tool bar 54 over the central tool bar 32, the first and third wing tool bars 38 and 54 are rotatably coupled to the central tool bar 32 by hinges 96 and 98. Specifically, the first wing tool bar 38 is rotatably coupled to the central tool bar 32 via the hinge 96, and the third wing tool bar 54 is rotatably coupled to the central tool bar 32 via the hinge 98. The hinge 96 includes a pin 100 that extends through openings in the first wing tool bar 38 and the central tool bar 32. Moreover, the hinge 98 includes a pin 102 that extends through openings in the third wing tool bar 54 and the central tool bar 32. As illustrated, the pins 100 and 102 of the hinges 96 and 98 extend in a direction non-parallel to the direction of travel 12 of the agricultural implement 10, thus facilitating the crosswise folding of the first and third wing tool bars 38 and 54.

In certain embodiments, the pin 100 of the hinge 96 is configured to compress the hinge 96 thereby distributing a load applied to the first wing tool bar 38 across the end 34 of the central tool bar 32. Moreover, the pin 102 of the hinge 98 is configured to compress the hinge 98 thereby distributing a load applied to the third wing tool bar 54 across the end 36 of the central tool bar 32. Accordingly, the longevity of the hinges 96 and 98 may be increased.

As discussed above, by folding the outer wings (e.g., second wing tool bar 44, fourth wing tool bar 60) over the inner wings (e.g., first wing tool bar 38, third wing tool bar 54), and by folding the inner wings crosswise over the central tool bar 32, the agricultural implement 10 may fold into a compact transport position for transportation and/or storage. The compact transport position reduces the center of gravity of the agricultural implement 10 to facilitate greater stability during transportation. Further, by being compact when folded, the agricultural implement 10 may be transported and/or stored in more locations and with greater ease than implements not having a compact folding arrangement.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
   a tool bar assembly comprising a central tool bar, a first wing tool bar rotatably coupled to a first end of the central tool bar via a first hinge, a second wing tool bar rotatably coupled to the first wing tool bar via a second hinge, a third wing tool bar rotatably coupled to a second end of the central tool bar via a third hinge, and a fourth wing tool bar rotatably coupled to the third wing tool bar via a fourth hinge, wherein the first and third hinges each comprise at least one pin to facilitate transition of the agricultural implement between a working position and a transport position, and each pin that facilitates rotational movement of the first wing tool bar relative to the central tool bar and each pin that facilitates rotational movement of the third wing tool bar relative to the central tool bar is non-parallel to a direction of travel of the agricultural implement;
   wherein to transition the agricultural implement from the working position to the transport position, the second wing tool bar folds over and substantially parallel to the first wing tool bar while the first wing tool bar is in the working position, the fourth wing tool bar folds over and substantially parallel to the third wing tool bar while the third wing tool bar is in the working position, and the first and third wing tool bars fold via the first and third hinges, respectively, crosswise over the central tool bar such that the first and second wing tool bars each cross the third and fourth wing tool bars.

2. The agricultural implement of claim 1, wherein the central tool bar, the first wing tool bar, the second wing tool bar, the third wing tool bar, and the fourth wing tool bar are substantially aligned with one another while the agricultural implement is in the working position.

3. The agricultural implement of claim 1, wherein the tool bar assembly is configured to fold to transition from the working position to the transport position, and to unfold to transition from the transport position to the working position.

4. The agricultural implement of claim 1, comprising a plurality of actuators configured to fold the tool bar assembly.

5. The agricultural implement of claim 1, comprising a latch configured to hold the second wing tool bar to the first wing tool bar while in the folded position.

6. The agricultural implement of claim 1, comprising a support bar coupled to the central tool bar and configured to hold the first wing tool bar over the central tool bar while in the folded position.

7. An agricultural implement, comprising:
a tool bar assembly comprising a central tool bar, a pair of inner wing tool bars, each inner wing tool bar being rotatably coupled to the central tool bar via a respective inner hinge, and a pair of outer wing tool bars, each outer wing tool bar being coupled to a respective inner wing tool bar of the pair of inner wing tool bars via a respective outer hinge, wherein to transition the agricultural implement from a working position to a transport position, the outer wing tool bars fold parallel to the inner wing tool bars and the outer wing tool bars fold over the inner wing tool bars via the respective outer hinges while the inner wing tool bars are in the working position, the inner wing tool bars fold via the respective inner hinges, crosswise over the central tool bar such that a first inner wing tool bar crosses a second inner wing tool bar, and the outer wing tool bars fold crosswise over the central tool bar such that a first outer wing tool bar crosses a second outer wing tool bar, wherein the respective inner hinges each comprise at least one pin to enable the inner wing tool bars to fold crosswise over the central tool bar, and each pin that facilitates rotational movement of the first inner wing tool bar relative to the central tool bar and each pin that facilitates rotational movement of the second inner wing tool bar relative to the central tool bar is non-parallel to a direction of travel of the agricultural implement.

8. The agricultural implement of claim 7, wherein the central tool bar, the pair of inner wing tool bars, and the pair of outer wing tool bars are substantially aligned with one another while the agricultural implement is in the working position.

9. The agricultural implement of claim 7, wherein the tool bar assembly is configured to fold to transition from the working position to the transport position, and to unfold to transition from the transport position to the working position.

10. The agricultural implement of claim 7, comprising a plurality of row units coupled to the tool bar assembly, wherein each row unit of the plurality of row units comprises a ground engaging tool to break soil to form a trench in a field, and an injection nozzle configured to deliver flowable agricultural product into the trench formed by the ground engaging tool.

11. An agricultural implement, comprising:
a tool bar assembly comprising a central tool bar, a first wing tool bar rotatably coupled to a first end of the central tool bar via a first hinge, a second wing tool bar rotatably coupled to the first wing tool bar via a second hinge, a third wing tool bar rotatably coupled to a second end of the central tool bar via a third hinge, and a fourth wing tool bar rotatably coupled to the third wing tool bar via a fourth hinge;
wherein the central tool bar, the first wing tool bar, the second wing tool bar, the third wing tool bar, and the fourth wing tool bar are substantially aligned with one another while the agricultural implement is in a working position, and wherein to transition the agricultural implement from the working position to a transport position, the second wing tool bar folds over and substantially parallel to the first wing tool bar via the second hinge while the first wing tool bar is in the working position, the fourth wing tool bar folds over and substantially parallel to the third wing tool bar via the fourth hinge while the third wing tool bar is in the working position, and the first and third wing tool bars fold via the first and third hinges, respectively, crosswise over the central tool bar such that the first and second wing tool bars each cross the third and fourth wing tool bars, wherein the first and third hinges each comprise at least one pin to enable the first and third wing tool bars to fold crosswise over the central tool bar, and each pin that facilitates rotational movement of the first wing tool bar relative to the central tool bar and each pin that facilitates rotational movement of the third wing tool bar relative to the central tool bar is non-parallel to a direction of travel of the agricultural implement.

12. The agricultural implement of claim 11, wherein the at least one pin of the first hinge is configured to compress the first hinge to distribute a first load applied to the first wing tool bar across the first end of the central tool bar, and the at least one pin of the third hinge is configured to compress the third hinge to distribute a second load applied to the third wing tool bar across the second end of the central tool bar.

* * * * *